United States Patent
Daly (10) Patent No.: US 7,450,181 B2
(45) Date of Patent: Nov. 11, 2008

(54) BIT-DEPTH EXTENSION WITH MODELS OF EQUIVALENT INPUT VISUAL NOISE

(75) Inventor: Scott James Daly, Kalama, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1700 days.

(21) Appl. No.: 10/062,387

(22) Filed: Feb. 1, 2002

(65) Prior Publication Data

US 2004/0165115 A9    Aug. 26, 2004

Related U.S. Application Data

(63) Continuation of application No. 09/426,165, filed on Oct. 22, 1999, now Pat. No. 6,441,867.

(51) Int. Cl.
*H04N 5/21* (2006.01)
(52) U.S. Cl. .................. 348/624; 348/607; 348/615; 348/617; 348/618
(58) Field of Classification Search ............... 348/607, 348/612, 615, 617–618, 621–622, 627, 624; 382/275, 254, 162; 345/596–599; *H04N 5/21, H04N 5/213, 5/217*
See application file for complete search history.

(56) References Cited

U.S. PATENT DOCUMENTS

| | | | |
|---|---|---|---|
| 3,244,808 A | 4/1966 | Roberts | |
| 3,562,420 A | 2/1971 | Thompson | |
| 3,739,082 A | 6/1973 | Lippel | |
| 3,961,134 A | 6/1976 | Jarvis | |
| 4,275,411 A | 6/1981 | Lippel | |
| 4,568,966 A * | 2/1986 | Lippel | 386/21 |
| 4,758,893 A | 7/1988 | Lippel | |
| 4,956,638 A | 9/1990 | Larky et al. | |
| 5,111,310 A | 5/1992 | Parker et al. | |
| 5,138,303 A | 8/1992 | Rupel | |
| 5,164,717 A | 11/1992 | Wells et al. | |
| 5,201,030 A | 4/1993 | Carrie | |
| 5,218,649 A | 6/1993 | Kundu et al. | |
| 5,309,526 A | 5/1994 | Pappas et al. | |
| 5,333,260 A | 7/1994 | Ulichney | |
| 5,404,427 A * | 4/1995 | Cawley et al. | 345/597 |
| 5,525,984 A | 6/1996 | Bunker | |
| 5,557,429 A | 9/1996 | Hirose | |
| 5,619,230 A | 4/1997 | Edgar | |
| 5,651,078 A | 7/1997 | Chan | |
| 5,696,602 A | 12/1997 | Cooper et al. | |
| 5,809,178 A | 9/1998 | Anderson et al. | |
| 5,912,745 A * | 6/1999 | Ulichney | 358/3.13 |
| 5,920,653 A | 7/1999 | Silverstein | |
| 6,040,876 A * | 3/2000 | Pettitt et al. | 348/624 |
| 6,147,671 A | 11/2000 | Agarwal | |
| 6,441,867 B1 * | 8/2002 | Daly | 348/607 |

OTHER PUBLICATIONS

English language Abstract of Japan, Publication No. 0918507, Publication Date: Jul. 15, 1997, Applicant: Texas Instruments Inc.

* cited by examiner

*Primary Examiner*—Trang U Tran
(74) *Attorney, Agent, or Firm*—Stolowitz Ford Cowger LLP (57) ABSTRACT

A method for extending bit-depth of display systems. The method includes creating pseudo-random noise from human visual system noise. When applied to the image data, the noise causes spatiotemporal dithering. The pseudo-random noise is combined with image data, producing noise-compensated image data. The noise-compensated image data is them quantized.

14 Claims, 6 Drawing Sheets

BIT-DEPTH EXTENSION WITH MODELS OF EQUIVALENT INPUT VISUAL NOISE

RELATED APPLICATIONS

This application is a continuation of Ser. No. 09/426,165, filed Oct. 22, 1999, now U.S. Pat. No. 6,441,867.

BACKGROUND

1. Field

This disclosure relates to digital displays, more particularly to methods for extending the bit depth of displays exploiting aspects of the human visual system.

2. Background

Continuous tone, or contone, imagery usually has 24 bits/pixel as a minimum. Eight bits are allocated for each color in typical displays. However, lower cost displays have limitations on the number of bits they can have per pixel. The limitations come from limited memory in video random access memory (VRAM), the characteristics of the display itself, or from digital to analog converters (DAC) used in some cathode ray tube (CRT) displays.

For example, in many laptop computers the highest gray-level resolution is often the 'thousands of colors' mode. This mode corresponds to 16 bits/pixel, rather than the 24 bits/pixel in larger computers or those having more VRAM. The 16 bits are typically allocated 5 bits for red, 6 bits for green and 5 bits for blue. In lesser quality products only 15 bits/pixel are used, with 5 bits allocated per color. The number of bits per pixel per color will be referred to as bit-depth.

In displays having limited bit-depth, contour artifacts appear in smooth gradient regions. For example, an image that includes part of the sky will show visible contour lines in the smooth gradient blue regions of the sky. Previous and current techniques for reduction of these artifacts exist.

L. G. Roberts performed some of the original work in this area in the area of contour prevention for pulse code modulation (PCM) coded and transmitted images. As this was the beginning of image compression efforts, it was a significant achievement to compress the image from 7 bits/pixel to 2 or 3 bits/pixel. The compression technique used a gray level resolution reduction via amplitude quantization. The primary distortion was the contouring artifacts, often manifested as false edges in slowly varying gradients.

Figure 1:
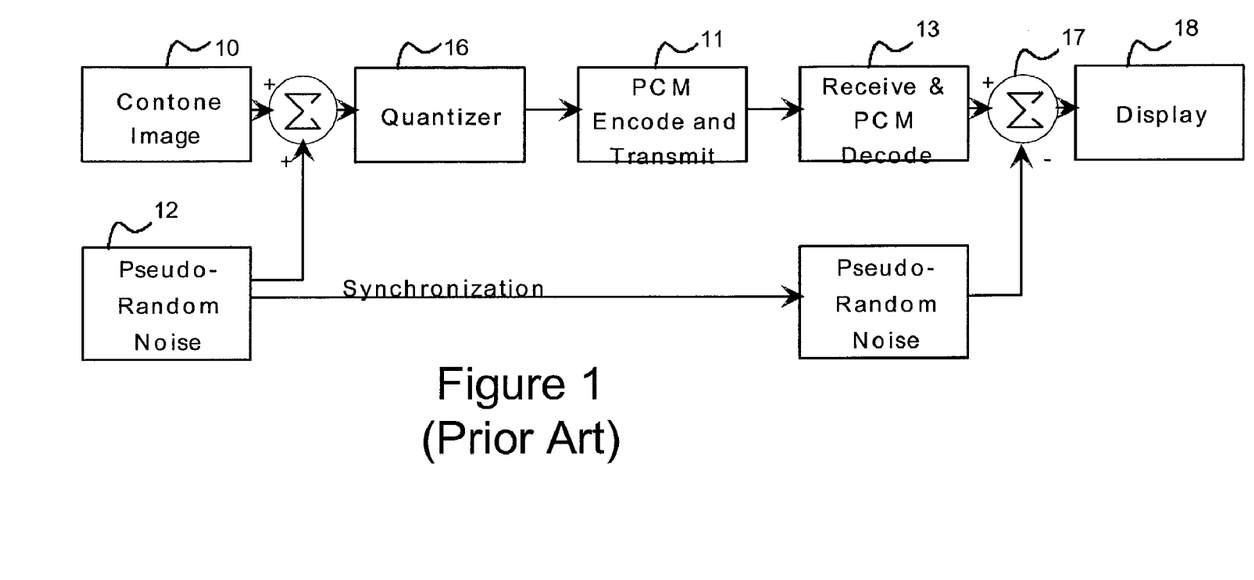
FIG. 1 is a prior art example of Roberts' Noise Modulation applied to displays.

In the Roberts technique, show in prior art FIG. 1, a one-dimensional white noise sequence that is predetermined is added to an image during a raster scan prior to quantization. Because the noise sequence is predetermined it is often referred to as pseudo-random noise. To avoid detracting from the image quality, the noise is removed after it is received, just prior to display of the data to which it was added. The subtracted noise is in phase with and identical to the transmitter noise. The noise effectively breaks up the contouring artifacts.

At the time this technique was promulgated, the breaking up of contouring artifacts was an empirical observation. However, it has come to be understood that the elements along the contour are varied in their orientation by the noise, so that they fall outside the association field for the visual system. The quantization process leaves some noise in the image, since it occurs between the steps of adding and then subtracting the noise.

Roberts' work has been largely forgotten as a compression technique. The newer techniques of digital pulse code modulation (DPCM), discrete cosine transform (DCT) and wavelet compression have enabled larger amounts of compression without contouring artifacts. The DCT and wavelet techniques accomplish this primarily by shifting the compression process from the spatial domain to the frequency domain.

Application of the Roberts' method can be found in U.S. Pat. Nos. 3,244,808, 3,562,420 and 3,739,082. The first patent, issued in 1966, implements a system similar to that shown in prior art FIG. 1. In this patent, the distribution of the noise is uniform and assumed to be white noise. The second patent builds on the first and includes an embodiment in which the noise is high-pass along both the spatial and temporal dimensions. In the third patent listed above, the system adds noise as in Roberts' approach, but does not remove noise at the receiver. The applied noise is in an ordered pattern.

These techniques are typically referred to as microdither to differentiate it from dither, a term more commonly applied to halftoning techniques. Halftoning dither is a spatial dither, but the microdither is an amplitude dither. A great deal of work has been done in halftoning, both for displays and printing applications. The references fall generally in two categories, either general dithering approaches using noise, or approaches specifically directed to eliminating the contour artifacts.

A general dithering approach for display systems can be found in U.S. Pat. No. 4,275,411, issued Jun. 23, 1981, and U.S. Pat. No. 3,961,134, issued Jun. 1, 1976. In the '411 patent spatiotemporal dither is used with two-dimensional arrays and included a process to make variations for other frames. In the '134 patent a quantized image is compared against a dither matrix. The dither matrix contains all values of grayscale appearing once, and therefore the size is dependent on the desired grayscale resolution. Other examples suffer from this limitation, as seen by U.S. Pat. No. 5,164,717, issued Nov. 17, 1992.

Other dithering approaches do not have a predetermined size for the dither array. In U.S. Pat. No. 4,758,893, issued Jun. 19, 1988, the size of the dither array is triggered by phase. Additionally, the description refers to characteristics of the human visual system. However, the reference is very general and essentially means that the spatial and temporal frequencies in the dithering patterns are high, as in one embodiment of U.S. Pat. No. 3,562,420, previously mentioned. Similarly, an approach using a dither bitmap to enable an image with a higher number of gray levels to be displayed on an output device with a lower number of gray levels is shown in U.S. Pat. No. 5,333,260, issued in 1994.

Use of the human visual system characteristics can also be found in U.S. Pat. No. 5,619,230, issued Apr. 8, 1997. The noise used is high-pass noise, but is applied in direct proportion to the visual system's sensitivity across frequency. Whether the sensitivity decreases or increases with increasing frequency depends upon the viewing distance and pixel resolution. For most viewing distances and pixel resolutions, the digital Nyquist frequency maps to a cycle/degree higher than 3-5 cycles/degree, which is the typical peak frequency of visual MTF. In this case, sensitivity will decrease with increasing frequency. However for low resolution and close distances, the opposite it true.

Other approaches use high-pass noise, or approximation of it. For example, U.S. Pat. No. 5,111,310, issued May 5, 1992, suggests designing the dithering array in such a manner that the resulting halftone patterns approximate blue (high-pass) noise.

The more common definition of dithering can be found in U.S. Pat. No. 4,956,638, issued Sep. 11, 1990. In this patent, dithering is defined as using a pattern of two colors or gray levels that are close to the desired color or level. When the eye averages the two colors or levels, they appear to be the desired color. This use of more than one bit for dithering is referred to as multi-bit dithering.

Other approaches to multi-bit dithering limit the size of the dither array for each pixel. For example, U.S. Pat. No. 5,138,303, issued Aug. 11, 1992, uses a dither array for each pixel that is 2×2. Other techniques base the size of the dither array on the number of desired gray levels. This is shown in U.S. Pat. No. 5,696,602, issued Dec. 9, 1997, where the dither array size of 16×16 results in 256 levels.

Dithering is applied in general cases as discussed above, and for specific problems. In one case where clipping and gray scale error function were the problems, multi-bit dithering was applied. This is found in U.S. Pat. No. 5,201,030, issued Apr. 6, 1993.

As mentioned above, the specific artifact under discussion is that of contouring, false edges in slowly varying gradients. Several techniques, including the addition of noise as in dithering, have been used to overcome this problem.

One approach is to segment the image into two regions, one of edges and one of non-edges, as shown by U.S. Pat. No. 5,218,649, issued Jun. 8, 1993. Each segment is filtered differently. The intention was for a post-processing for compressed and decompressed images.

Other techniques are directed to a particular compression or decompression technique. For example, U.S. Pat. No. 5,651,078, issued Jul. 22, 1997, addresses contouring artifacts in MPEG (Moving Pictures Experts Group) and MPEG2 schemes. In these schemes, contouring can occur in the dark areas of images. The technique applies different gains to the areas, boosting the captured image noise to break up the artifacts.

Contouring as a particular example of amplitude quantization artifact is discussed in U.S. Pat. No. 5,809,178, issued Sep. 15, 1998. The technique suggests performing an experiment to determine the quantization interval based upon noise already present in the image. It suggests that the interval of noise/quantization should be ⅜.

Finally, contouring artifacts in print are addressed by U.S. Pat. No. 5,920,653, issued Jul. 6, 1999. It uses two channels, one layer is a channel making large dots and the other is a channel making small dots.

However, none of these approaches solves the problem in a robust, computationally simple manner. In addition, the number of bits needed is still relatively high. A method that allowed even lower bit depth displays to appear similar to displays with higher levels, with noise that is less visible would be useful.

SUMMARY

One embodiment of the invention is a method for extending bit-depth of display systems. The method includes creating pseudo-random noise from human visual system noise. When applied to the image data, the noise causes spatiotemporal dithering. The pseudo-random noise is combined with image data, producing noise-compensated image data. The noise-compensated image data is then quantized.

BRIEF DESCRIPTION OF THE DRAWINGS

The invention may be best understood by reading the disclosure with reference to the drawings, wherein.

DETAILED DESCRIPTION OF THE EMBODIMENTS

As discussed previously, FIG. 1 shows a prior art embodiment of application of Roberts' noise modulation to transmission systems. A contone image, 10, which in this example has 6 bits/pixel, is combined with a one-dimensional, predetermined, white noise sequence, pseudo-random noise 12. The noise is subtracted at 17 after the image data is quantized 16, encoded and transmitted 11, and received and decoded 13. The quantization process left some residual noise in the image due to the quantization being between the addition and subtraction steps.

The encoding scheme used was pulse code modulation (PCM) and dropped the bits/pixel from 6 to 2. This work was largely based upon the compression context and has fallen by the wayside, as compression techniques became more sophisticated. Digital pulse code modulation (DPCM) and discrete cosine transform (DCT) enable more compression without generating contouring artifacts, primarily by shifting compression from the spatial domain to the frequency domain.

Figure 2:
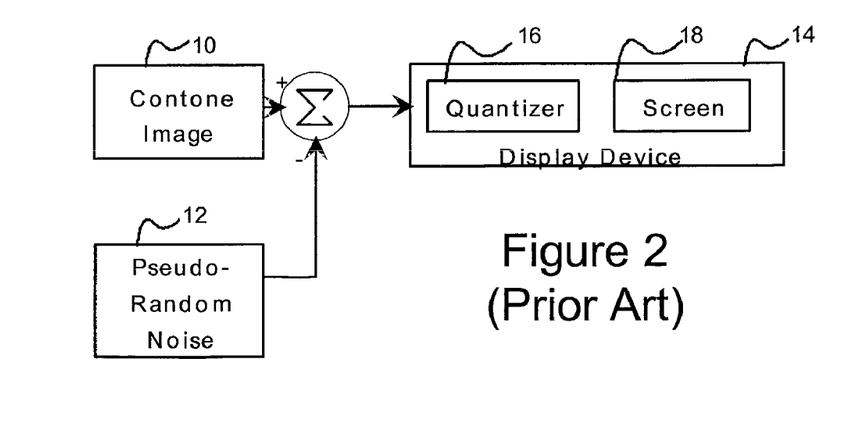
FIG. 2 shows a prior art embodiment of applying noise to a bit-depth limited display system.

However, the general idea has some application to bit-depth limited displays. FIG. 2 shows one embodiment of an application of noise modulation to these displays. The contone image 10 is combined with pseudo-random noise 12 and then sent to the display device 14. The combined data is quantized by quantizer 16 and displayed on screen 18. Experiments testing this invention have shown that this technique is effective in reducing contouring artifacts, especially when going from 256 to 64 levels (8 bits/pixel to 6 bits/pixel). However, the inability to subtract the noise results in an image that has visible noise.

Figure 3:
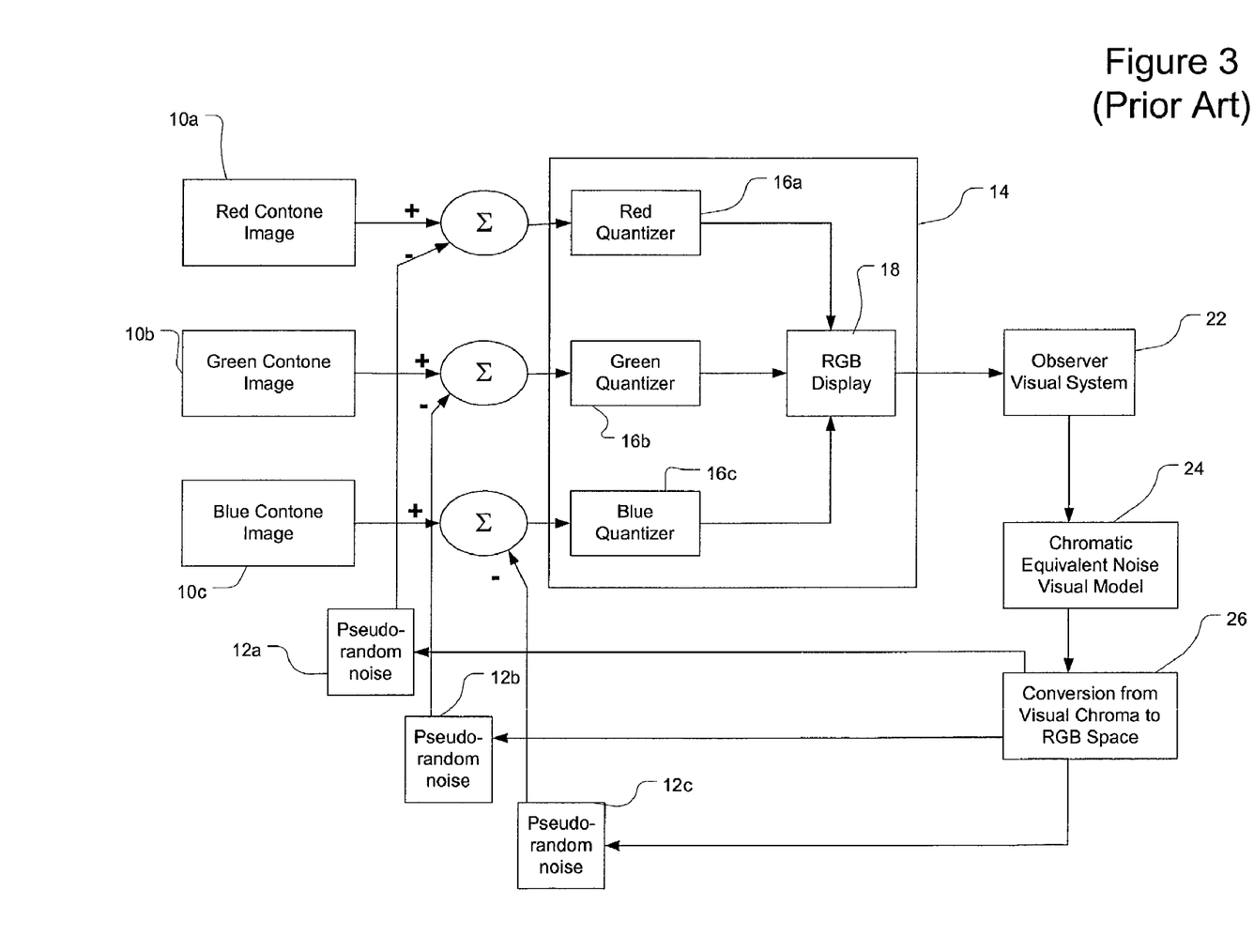
FIG. 3 shows a prior art embodiment of using visual system noise in a bit-depth limited display system.

U.S. patent application Ser. No. 09/426,165, filed Oct. 22, 1999, showed one embodiment of how to apply the idea to color images, as shown in FIG. 3. FIG. 3 shows that a color equivalent noise model for the visual system is used. This noise is generally not in the RGB space, so it must be converted to the RGB space for separation into color image planes and then added to the RGB planes of the image.

In this approach the HVS model 24 is a chromatic model that generates three different pseudo-random noise planes 12a-c. The model includes the equivalent input noises of the luminance channel and two isoluminant color channels of the visual system, analogous to the L*, A*, and B* channels of the CIELAB color metric. In addition, different CSFs (contrast sensitivity functions, or the frequency response of the human visual system) for these three channels are used, each having different bandwidths and shapes. This is in order to generate three equivalent input noise pseudo-random images. These are then converted from the L*, A*, B* domain to the RGB domain for adding to the image prior to the quantization.

While the static dither techniques described above work, there is room for improvement. The improvements allow for even lower levels of bits to look like the higher level, or for allowing the dithering noise to be less visible. In practice, this allows the user to look more closely at the display without perceiving the contouring artifacts. With the number of appliances with small screens increasing, the likelihood of a user having the screen closer to their eyes increases as well. In displays with capability of displaying temporally changing signals, it is worthwhile to do spatiotemporal dither.

In particular, early approaches use noise that is white both spatially and temporally, up to the digital frequency Nyquist limits (0.5 cycle/sample; sample=pixel or frame). In discussing this type of noise, reference may be made to horizontal spatial frequency, HSF, vertical spatial frequency, VSF, or temporal frequency, TF.

U.S. Pat. No. 3,562,420, mentioned previously, generated a high-pass spatial noise and oscillated its polarity, since noise is zero mean, per frame. The static noise used shifts to higher temporal frequencies (in particular, the Nyquist frequency). This was an improvement since the higher TF noise was harder to see due to the temporal LPF nature of the visual system. Visual models were not used in the design of this noise. Rather, the general concept that higher frequencies are harder to see.

Figure 4:
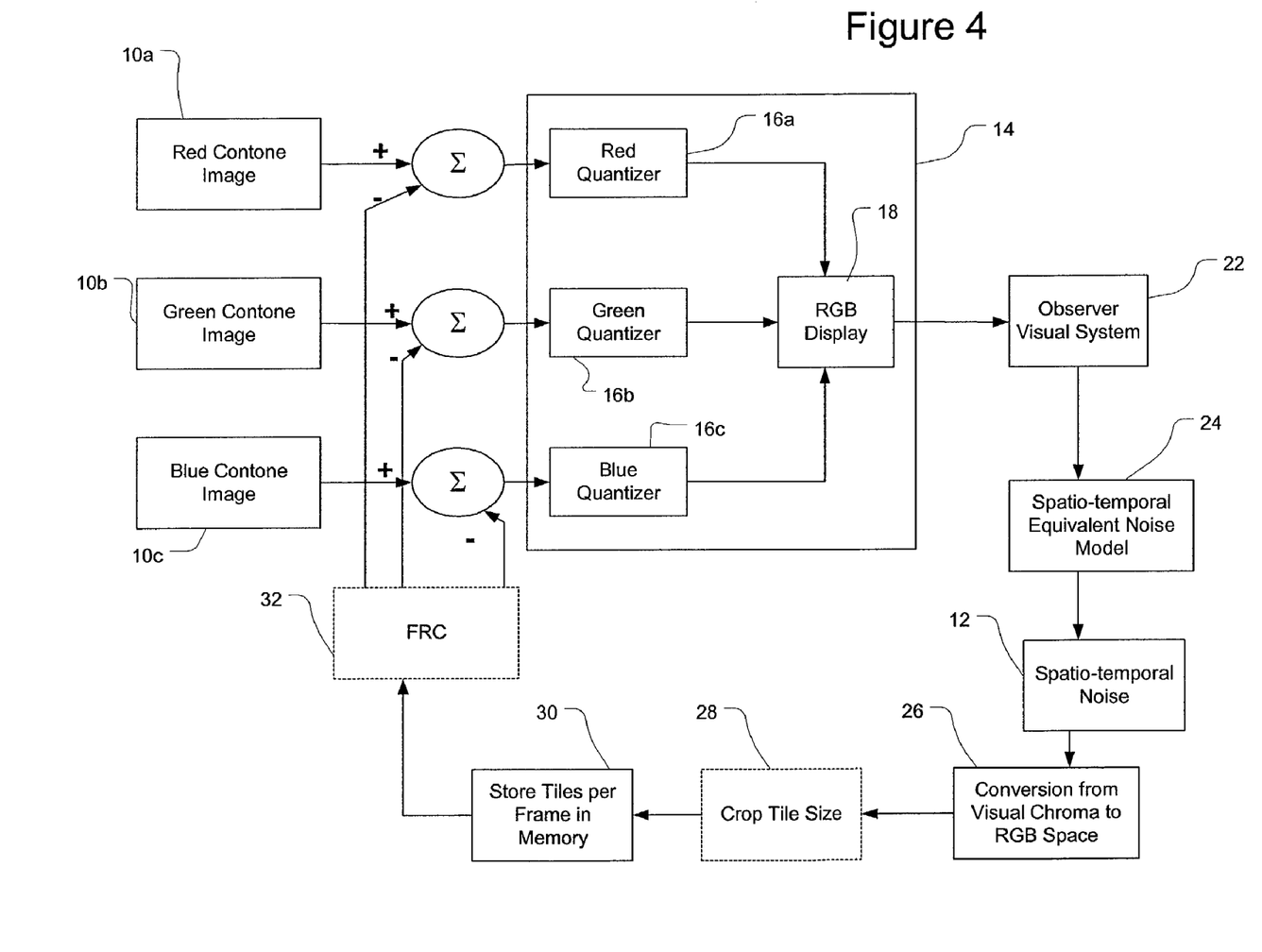
FIG. 4 shows an embodiment of using human visual system noise for spatiotemporal dithering in a bit-depth limited display system, in accordance with the invention.

FIG. 4 shows an embodiment of using spatiotemporal dithering based upon human visual system-sensitive noise in a display system. In this instance, the noise 12 is of a different profile than that used in the prior art FIG. 3. This noise is based upon spatiotemporal dithering, instead of spatial-only, as is used in the previous example.

If a series of different high-pass spatial dithers are applied per frame, the resulting spatiotemporal dither has a white TF spectrum. This occurs if the noises are generated independently, and also occurs with most techniques of re-arranging an existing spatial dither patent, such as that discuss in U.S. Pat. No. 3,739,082, discussed previously.

A different approach to generate a high-pass spatial and temporal noise is to use a technique drawing from unsharp masking. Here a spatiotemporal LPF (low-pass frequency) noise is generated from a white noise source. This LPF approach is taken since it is often easier to make a LPF noise than an HPF (high-pass frequency) noise, particularly if done in hardware.

This mutually LPF spatiotemporal noise is subtracted from the white noise. However, this resulting noise is not mutually HPF spatially and temporally. There are low temporal frequencies at high spatial frequencies, as well as low spatial frequencies at high temporal frequencies, which can cause visible flickering.

Figure 6:
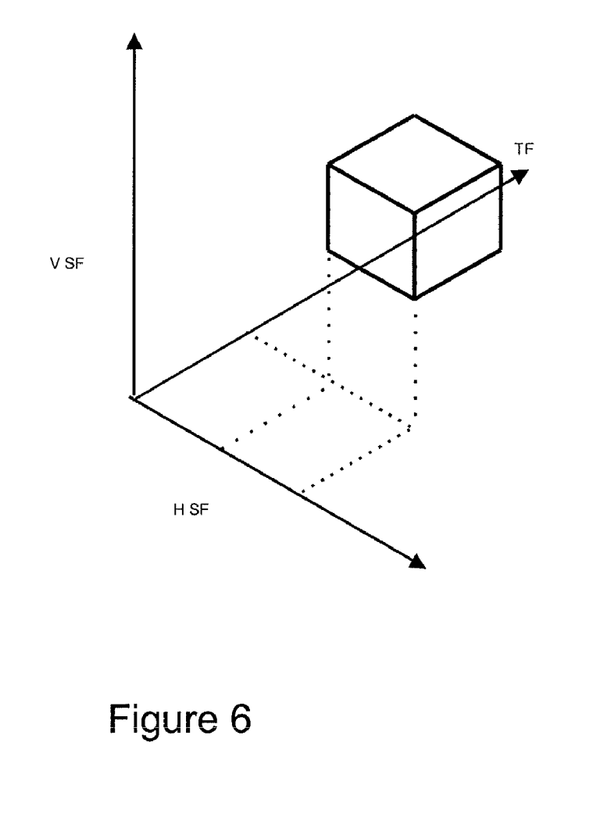
FIG. 6 shows a graphical representation of a mutually high-pass dither spectral content, in accordance with the invention.

The generation of a spectrum that is mutually HPF both spatially and temporally may be accomplished in many ways. In one embodiment, a white spatiotemporal spectra, one that is white up to the spatial and temporal Nyquist frequencies, may be filtered to preserve only the HPF noise. Alternatively, magnitude substitution of any spatiotemporal spectra may be used. One example of mutually high-pass spatially and temporally is shown graphically in FIG. 6.

The approach of filtering the white spatiotemporal spectra begins with a 3D image array, with dimensions of pixels in the horizontal spatial and vertical spatial, and frames for the temporal, filled with a white spectrum. In one embodiment, the spectrum is from a noise that is first spatially filtered in each frame by a filter that approximates the inverse of the spatial CSF of the visual system. The result is temporally filtered with the inverse of the temporal CSF of the visual system. Approximations can be used for each of these CSF filters, for example Gaussian filters are a good $1^{st}$ order approximation.

Some embodiments include setting the 3D array to the exact size as will be used in the application, and performing the filtering via FFT (fast Fourier Transforms) without padding, so that wraparound characteristics of the digital filtering do not cause boundary discontinuities such as going from the last frame to the starting frame) in the spectral statistics.

In another embodiment, the starting 3D image array may not be filled with noise, but rather any image content such as textures in multiple planes of motion such as snow in turbulence that has been pre-whitened.

In an embodiment using magnitude substitution any kind of image content may be the starting point, and after FFT, the magnitudes of the coefficients are substituted with values that are proportional to the inverse spatial and temporal CSFs. The phases of the coefficients are left as is.

To extend this noise to color applications, one embodiment generates two independent spatiotemporal arrays. These are applied to opponent color signals, and transformed via a matrix from having an achromatic, and two chromatic signals (such as L*, A*, and B*, or Y, U, and V) into a 3-channel RGB signal.

Figure 5:
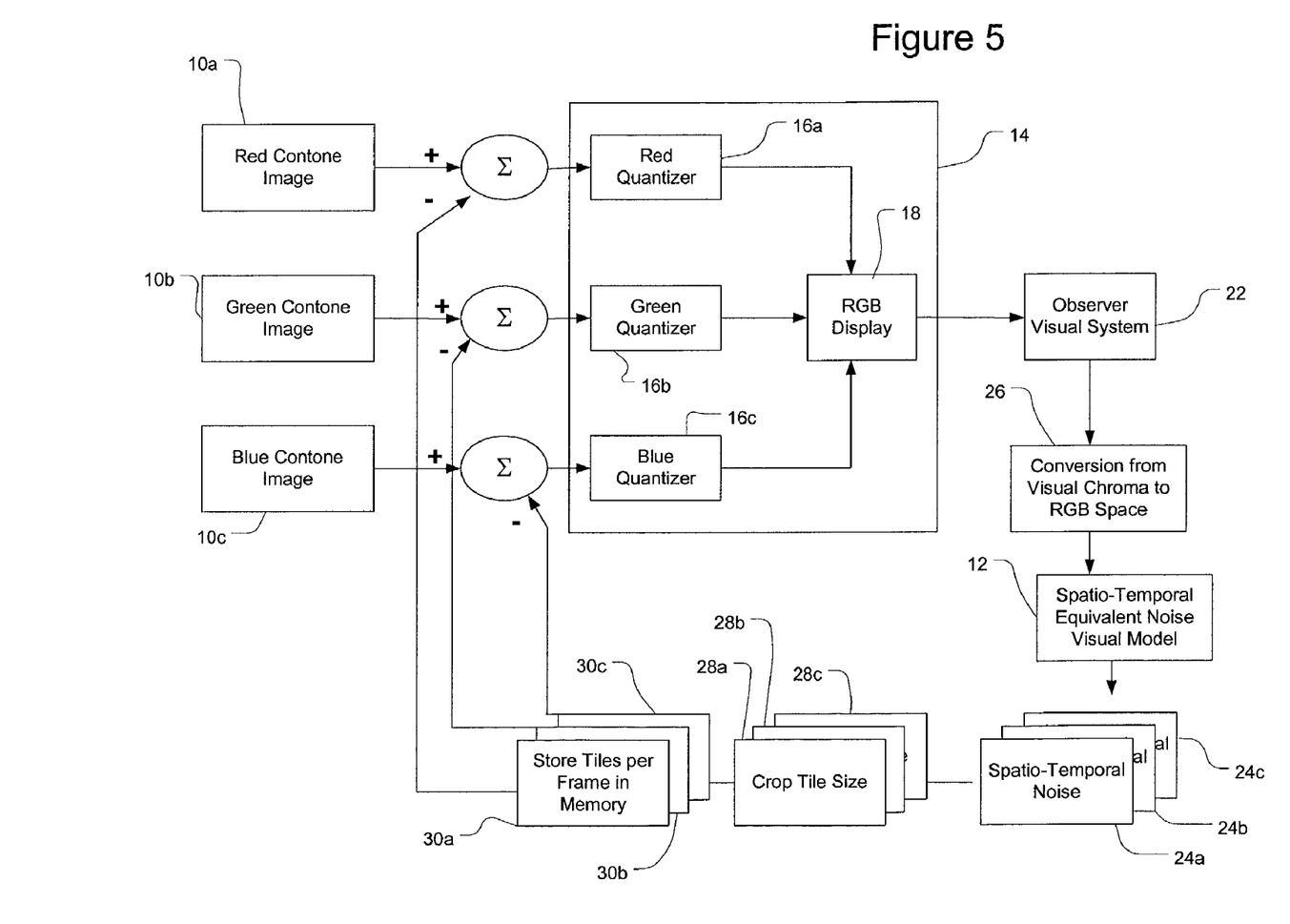
FIG. 5 shows an alternative embodiment of using human visual system noise for spatiotemporal dithering in a bit-depth limited display system, in accordance with the invention.

A general block diagram of one embodiment of a method to use spatiotemporal dithering in a bit-depth limited display is shown in FIG. 4. As can be seen the image data is divided into the RGB color channels at 10a-c. The chromatic equivalent noise visual model 12 that uses spatiotemporal dithered noise is generated at 12. As mentioned before, the noise is mostly likely added prior to conversion to the RGB color space at 26, although it can be added by individual component as shown in FIG. 5.

The size of the array may have some significance, depending upon the system implementation. In most of the previous patents, the dither pattern is a smaller 2D array than the image. The dither pattern is repeated contiguously across the image as needed in a step called tiling. If tiling is to be used, the tile size is cropped at 28 and the tile stored in memory at 30. The noise is stored as a 3d array, though mapped in memory as 1d as is typical, rather than using a technique to modify a 2d noise so it varies per frame. In some instances, as will be discussed in more detail below, further breaking up of the contours may be achieved using frame polarity reversal (FRC) 32 where the polarity of the noise is reversed in alternating frames. However, this step is optional. This results in the final noise profile that is combined with the various color channel image data and quantized. The combination of the various color channels image data may be an addition or a subtraction. For purposes of discussion, combination will include subtraction, addition or multiplication, as well as other forms of combination. Quantization may take the form of reducing the number of bits used in representing the image data.

As mentioned above, tiling may be necessary, depending upon the implementation of the noise array. Most patents using spatiotemporal noise generate the temporal component of the noise by manipulation of a spatial noise stored in memory. That is, the noise is not stored in a 3d spatiotemporal representation. However, U.S. Pat. No. 6,147,671, by Agarwal that issued Nov. 11, 2000, does store a 3D spatiotemporal noise.

Figure 7:
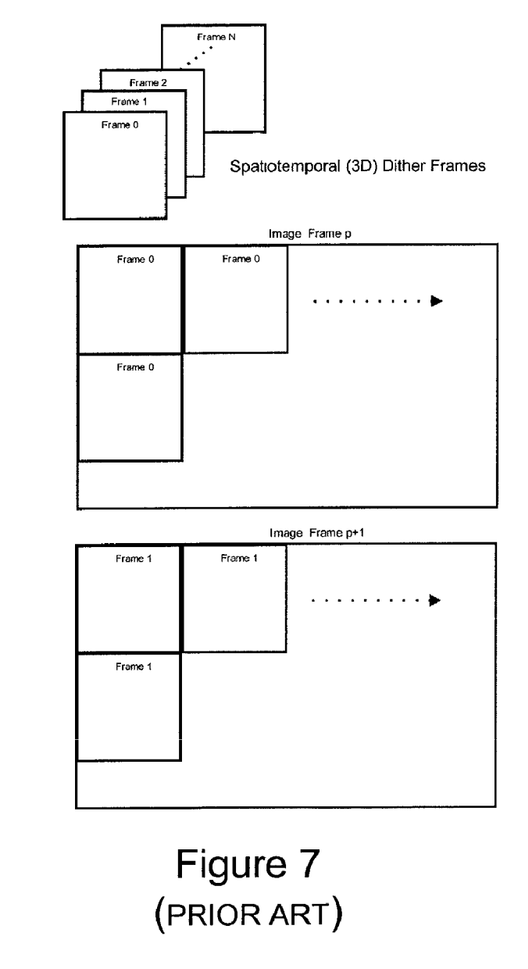
FIG. 7 shows a prior art embodiment of a method of tile stepping a dither array on frames of image data.

As can be seen in FIG. 7, the noise is stored as a spatial array that has multiple frames. The spatial array is tiled across the image as needed, and the different frames of the dither are stepped through in sync with the image's frames. When the dither frames run out, they are repeated temporally. A problem with this approach occurs when the spatial tile is reduced. The contiguous repetition of the same tile in a frame can lead to periodic patterns that are easier to see than the noise or pattern contained within the individual tile.

Figure 8:
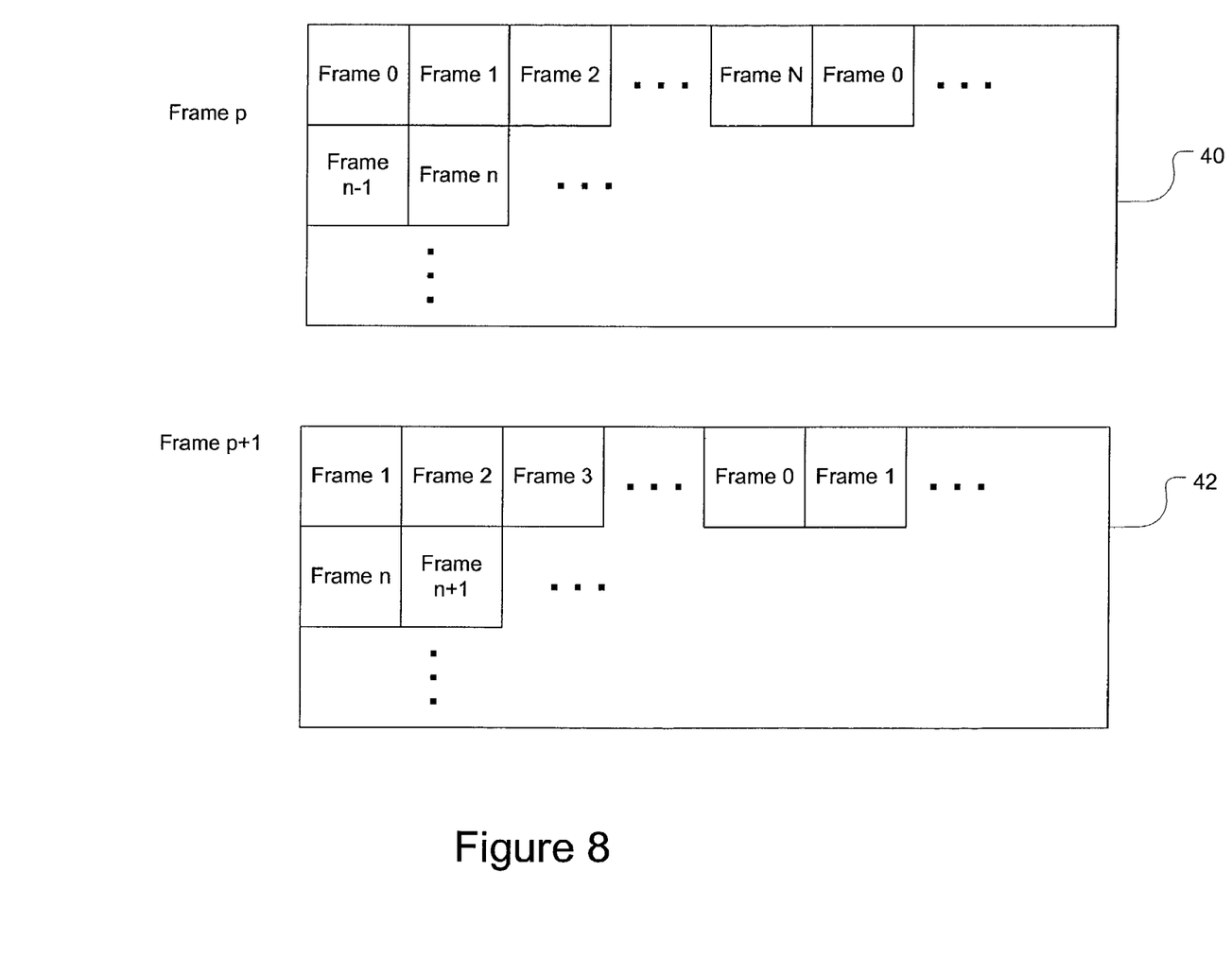
FIG. 8 shows an embodiment of a method of tile stepping a spatiotemporal dither array on frames of image data, in accordance with the invention.

In one embodiment of the present invention, the spatiotemporal array of dither values may be tiled across the image sequence to be displayed. The dither array is smaller than the image array in order to save memory costs, so it must be tiled both spatially and temporally across the image sequence. The preferred way it to step through the frames of the dither array spatially across the image in a repeating manner, either horizontally and vertically, or horizontally, with increment steps at the start-of-row repeat positions or some other index position. This is shown in frame p, 40, and Frame p+1, 42, of FIG.

8. This is intended to avoid the formation of periodic patterns via repeats of the same dither tile frame in a single image frame. Such periodic patterns can be more detectable than the pattern in a single tile. This method further reduces the visibility of the spatiotemporal dither array.

There are numerous other embodiments, as well as alternatives that may work better in other implementations. For example, the process described in the embodiments performs the spatial and temporal filtering in separate steps, referred to here as separable spatial and temporal dithering. An alternative approach uses a spatiotemporal filter and performs the filtering in one step. The reason for doing this is that more accurate models of the visual system are not spatiotemporal separable.

Another embodiment adds the noise in the gamma-corrected domain, and the hardware of the display applies the inverse gamma correction, an accelerating nonlinearity. Another related approach is to take the generated dither noise and pass it through the gamma-corrected nonlinearity before adding to the gamma-corrected image signal. The sum of these is passed through the inverse nonlinearity.

While not necessarily the best approach for breaking up contours, an alternative embodiment uses the mutually high-pass dither spectrum in the tile stepping format discussed above. An example of this type of spectrum is shown in graphically format in FIG. 6. The dither frames are repeated through the whole image, and then stepped through in sync with the image frames. Another embodiment is to step through the tiles randomly in positioning them into the 2D image. Once this pattern is set, their frames are each sequentially stepped through in sync with the image frames. That is, it is allowable to spatially randomize the tiles, but their temporal order must be preserved to maintain the desired temporal statistics. Another embodiment starts the increments at the end-of-frame positions in the grid.

This embodiment uses the display's temporal characteristic as well as those of the human visual system. The temporal switching times of an LCD may be used, as an example. The slowest time is used to determine how many frames must be used. If fewer frames are used, some gray level transitions do not settle before the temporal aspect of the dither repeats. This may cause stuck pixels, isolated pixels that do not modulate and average to zero. The other way the temporal switching times can be used is to take the fastest response, take its Fourier transfer, and use this to represent the fastest temporal MTF of the display. This best-case temporal MTF of the display is then multiplied with the temporal CSF of the visual system and then inverted to shape the temporal spectral characteristics of the dither array in the manner discussed above.

Some further aspects of the approach used in this invention should be noted. In all of the dither arrays of the prior art, the dither array consists of a series of values such that the values are not repeated. Applications of this invention do not have this restriction.

In all prior art, the PDF (probability density function) of the dither pattern is uniform, usually spanning the final output quantization bin. After filtering applied in accordance with this invention, a Gaussian PDF results, and if this is converted to a uniform PDF, then the desired statistics are changed. Leaving the Gaussian PDF as is, the spectral statistics seem more important than the PDF shape. This allows more flexibility in controlling the shape of the spectrum.

Thus, although there has been described to this point a particular embodiment for a method and apparatus for spatiotemporal dithering of image data for bit-depth extension in displays, it is not intended that such specific references be considered as limitations upon the scope of this invention except in-so-far as set forth in the following claims.

What is claimed is:

1. A method for extending bit-depth of display systems, comprising the steps of:
   creating pseudo-random noise from human visual system noise, wherein the noise causes spatiotemporal dithering;
   combining the pseudo-random noise with image data, thereby producing noise-compensated image data; and
   quantizing the noise-compensated image data,
   wherein multiple different dither frames having different dither frame patterns are tiled across individual image data frames in a repeating dither frame pattern sequence and the repeating dither frame pattern sequence is offset spatially by dither frame increments in different temporal image data frames.

2. The method of claim 1, further comprising:
   randomly tiling together the different dither frames to form a random dither frame pattern sequence;
   applying the random dither frame pattern sequence to a first one of the image data frames;
   spatially offsetting the random dither frame pattern sequence by a dither frame increment; and
   applying the offset random dither frame pattern sequence to a next temporally different one of the image data frames.

3. The method of claim 1, wherein the spatiotemporal noise generation is performed in a separable fashion across the spatial and temporal dimensions.

4. The method of claim 1, wherein the spatiotemporal generation is performed as a single process.

5. The method of claim 1, wherein the noise is stored as a three-dimensional array.

6. The method of claim 1, wherein the noise is stored as a spatiotemporal noise in a gamma-corrected space.

7. The method of claim 1, wherein the noise is stored in a two-dimensional array.

8. The method of claim 7, wherein the noise includes repeating values in a frame.

9. The method of claim 1, wherein creating pseudo-random noise further comprises:
   creating the noise in dither frames having a smaller size than frames of the image data; and
   tiling the dither frames on the frames of image data.

10. The method of claim 9, wherein different dither frames are tiled across each frame of the image data in a repeating pattern with increments at start-of-row positions.

11. The method of claim 9, wherein different dither frames are tiled across each frame of the image data in a repeating pattern with increments at end-of-frame positions.

12. The method of claim 9, wherein dither start frames are placed randomly within each image frame and then stepped through in a repeating pattern such that temporal phases of neighboring tiles are out of sync.

13. The method of claim 1, wherein temporal characteristics of a display are used to determine a number of dither frames.

14. The method of claim 1, wherein temporal characteristics of a display are used with a visual model contrast sensitivity function to shape the spatiotemporal dithering.

* * * * *